United States Patent [19]

Kurihara et al.

[11] Patent Number: 4,887,344
[45] Date of Patent: Dec. 19, 1989

[54] METHOD OF MOUNTING A TORQUE CONVERTER ON A TRANSMISSION

[75] Inventors: Haruto Kurihara, Hiroshima; Koji Uchida, Higashihiroshima, both of Japan

[73] Assignee: Mazda Motor Corporation, Hiroshima, Japan

[21] Appl. No.: 329,292

[22] Filed: Mar. 27, 1989

[30] Foreign Application Priority Data

Apr. 3, 1988 [JP] Japan ................................ 63-81641

[51] Int. Cl.⁴ .............................................. B23Q 3/00
[52] U.S. Cl. ........................................ 29/468; 29/469; 29/701; 74/606 R; 74/730; 192/3.29
[58] Field of Search ................. 29/468, 469, 271, 701; 192/3.29; 74/606, 730

[56] References Cited

U.S. PATENT DOCUMENTS

| | | | |
|---|---|---|---|
| 1,941,022 | 12/1933 | Shelley | 29/468 |
| 3,703,031 | 11/1972 | Fodrea | 29/469 |
| 4,177,694 | 12/1979 | Lachaize | 74/730 X |
| 4,311,067 | 1/1982 | Froumajou | 74/730 X |
| 4,468,989 | 9/1984 | Rosen | 74/730 X |
| 4,502,279 | 3/1985 | Fuehrer | 29/469 X |
| 4,768,633 | 9/1988 | Kubo et al. | 192/3.29 X |
| 4,793,213 | 12/1988 | Nishimura | 74/606 X |
| 4,795,015 | 1/1989 | Hibino et al. | 192/3.29 X |

FOREIGN PATENT DOCUMENTS 62-224536 10/1987 Japan .

Primary Examiner—Charlie T. Moon
Attorney, Agent, or Firm—Gerald J. Ferguson, Jr.

[57] ABSTRACT

A method of mounting a torque converter on a transmission comprises the steps of setting the transmission to have the tubular members extending horizontally, holding the torque converter by holding means which is movable in vertical and horizontal directions, positioning the torque converter to cause an imaginary axis of a turbine runner in the torque converter to coincide with a common imaginary axis of two coaxial tubular members in the transmission, moving the torque converter toward the transmission in the horizontal direction so as to engage an engaging portion of the turbine runner with an end portion of an inner one of two coaxial tubular members of the transmission, positioning further the torque converter to cause an imaginary axis of a stator in the torque converter to coincide with the common imaginary axis of two tubular members; and moving further the torque converter toward the transmission in the horizontal direction so as to engage an engaging portion of the stator with an end portion of an outer one of two tubular members of the transmission.

10 Claims, 4 Drawing Sheets

METHOD OF MOUNTING A TORQUE CONVERTER ON A TRANSMISSION

BACKGROUND OF THE INVENTION

1. Field of the Invention

The present invention relates to a method of mounting a torque converter on a transmission, by which a turbine runner and a stator contained in a case of the torque converter are mounted respectively on tubular members disposed coaxially in the transmission.

2. Description of the Prior Art

An automatic power transmitting unit which comprises a fluid torque converter and a transmission having a multi-stage gear arrangement including a planetary gear mechanism has been generally employed in a vehicle. The torque converter has a case which provided with a pair of opposed openings at a central portion thereof and contains a pump impeller incorporated with the case, a turbine runner disposed to be rotatable, and a stator fixed to the transmission to be interposed between the pump impeller and the turbine runner. An end portion of a tubular turbine shaft of the transmission, on which external spline teeth are provided, is inserted into the case of the torque converter through one of the openings provided thereon to engage with a turbine hub provided at the central part of the turbine runner contained in the case, on which internal spline teeth are provided, and an end portion of a fixed tubular member provided for surrounding the tubular turbine shaft in the transmission, on which external spline teeth are provided, is also inserted into the case of the torque converter through the opening provided thereon to engage with a stator hub provided at the central part of the stator contained in the case, on which internal spline teeth are provided.

For mounting the torque converter on the transmission in a process of assembling the automatic power transmitting unit, there has been proposed such a method as to include the steps of setting the transmission to have the tubular turbine shaft thereof extending vertically so as to make its end portion project upward with the external splines provided thereon, setting the torque converter above the transmission to have an imaginary axis of the turbine runner and an imaginary axis of the stator each extending vertically, and causing the torque converter set above the transmission to descend toward the transmission so as to engage the internal spline teeth of the turbine hub with the external spline teeth provided on the end portion of the tubular turbine shaft and to engage the internal spline teeth of the stator hub with the external spline teeth provided on the end portion of the fixed tubular member.

Further, there has been also proposed another method of mounting the torque converter on the transmission, which includes the steps of setting the transmission to have the tubular turbine shaft thereof extending horizontally as to make its end portion project laterally with the external splines provided thereon, setting the torque converter by the side of the transmission to have an imaginary axis of the turbine runner and an imaginary axis of the stator each extending horizontally and to face the end portions of the tubular turbine shaft and the fixed tubular member of the transmission, and causing the torque converter to be automatically positioned for engaging the internal spline teeth of the turbine hub with the external spline teeth provided on the end portion of the tubular turbine shaft and for engaging the internal spline teeth of the stator hub with the external spline teeth provided on the end portion of the fixed tubular member, as disclosed in, for example, the Japanese patent application published before examination under publication No. 62-224536.

In the case of the method by which the torque converter is set above the transmission and then combined with the transmission, since the torque converter is put in a condition wherein the turbine runner and the stator are movable freely in the horizontal direction with the respective imaginary axes extending vertically in the case of the torque converter, it is necessary for aligning vertically the end portion of the tubular turbine shaft and the end portion of the fixed tubular member with the turbine hub and the stator hub, respectively, to have positioning and rotatory adjustment of the torque converter in process of descending the torque converter toward the transmission. Accordingly, considerably complicated positioning of the torque converter in relation to the transmission and a relatively long working time are undesirably required for mounting the torque converter on the transmission.

On the other hand, in the case of the method by which the torque converter is set to have the tubular turbine shaft thereof extending horizontally and the torque converter is set by the side of the transmission to have the imaginary axes of the turbine runner and the stator each extending horizontally and to face the end portions of the tubular turbine shaft and the fixed tubular member of the transmission and then caused to be automatically positioned for engaging the internal spline teeth of the turbine hub with the external spline teeth provided on the end portion of the tubular turbine shaft and for engaging the internal spline teeth of the stator hub with the external spline teeth provided on the end portion of the fixed tubular member, it is required for aligning horizontally the end portion of the tubular turbine shaft and the end portion of the fixed tubular member with the turbine hub and the stator hub, respectively, to have annoying and complicated vertical positioning of the torque converter prior to phase adjustments of the spline teeth provided on both of the transmission and the torque converter except for some measures provided particularly for avoiding the requirement. However, there has not been proposed any prior art providing such measures as to avoid the disadvantage in the above described case.

OBJECTS AND SUMMARY OF THE INVENTION

Accordingly, it is an object of the present invention to provide a method of mounting a torque converter on a transmission, by which a turbine runner and a stator contained in a case of the torque converter are mounted respectively on tubular members disposed coaxially in the transmission, and which avoids the foregoing disadvantages and problems encountered with the prior art.

Another object of the present invention is to provide a method of mounting a torque converter on a transmission, by which a turbine runner and a stator contained in a case of the torque converter can be mounted respectively on tubular members disposed coaxially, such as a tubular turbine shaft and a fixed tubular member provided for surrounding the tubular turbine shaft, in the transmission surely and easily with relatively simple positioning of the torque converter.

According to the present invention, there is provided a method of mounting a torque converter on a transmission, wherein the torque converter has a case in which a turbine runner provided at its central part with an engaging portion and a stator provided at its central part with an engaging portion are contained to be displaceable substantially in parallel within respective different ranges of displacement and the transmission has at least two tubular members disposed coaxially in such a manner that an end portion of an inner one of two tubular members projects outward from an end portion of an outer one of two tubular members, the method comprising the steps of setting the transmission to have the tubular members extending horizontally; holding the torque converter by holding means which is movable in vertical and horizontal directions; positioning the torque converter held by the holding means so as to cause an imaginary axis of the engaging portion of one of the turbine runner and the stator to coincide with a common imaginary axis of two tubular members of the transmission; moving the torque converter held by the holding means toward the transmission in the horizontal direction so as to engage the engaging portion of one of the turbine runner and the stator, which has the imaginary axis positioned to coincide with the common imaginary axis of two tubular members of the transmission, with the end portion of the inner one of two tubular members of the transmission; positioning further the torque converter held by the holding means so as to cause an imaginary axis of the engaging portion of the other of the turbine runner and the stator to coincide with the common imaginary axis of two tubular members of the transmission; and moving further the torque converter held by the holding means toward the transmission in the horizontal direction so as to engage the engaging portion of the other of the turbine runner and the stator, which has the imaginary axis positioned to coincide with the common imaginary axis of two tubular members of the transmission, with the end portion of the outer one of two tubular members of the transmission.

With the method carried out as described above according to the present invention, since the imaginary axes of the turbine runner and the stator contained in the case of the torque converter are at respective positions displaced downward in relation to an imaginary axis of the torque converter and extend horizontally in parallel with the common imaginary axis of two tubular members of the transmission after the transmission is set and the torque converter is held by the holding means, the engaging portion of one of the turbine runner and the stator is aligned to the inner one of two tubular members of the transmission by means of the first vertical movement, for example, upward movement of the torque converter and then engaged with the inner one of two tubular members of the transmission by means of the first lateral movement of the torque converter. After that, the engaging portion of the other of the turbine runner and the stator is aligned to the outer one of two tubular members of the transmission by means of the second vertical movement, for example, downward movement of the torque converter and then engaged with the outer one of two tubular members of the transmission by means of the second lateral movement of the torque converter.

In the manner described above, the turbine runner and the stator contained in the case of the torque converter are engaged with two tubular members disposed coaxially in the transmission, respectively, so that the torque converter is mounted on the transmission surely and easily through simplified vertical positionings and lateral movements of the torque converter.

The above, and other objects, features and advantages of the present invention will become apparent from the following detailed description which is to be read in conjunction with the accompanying drawings.

DESCRIPTION OF THE PREFERRED EMBODIMENT

Figure 1:
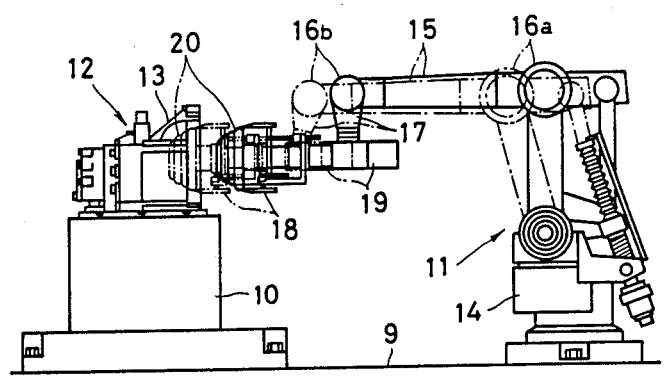
FIGS. 1 and 2 are side views used for explaining the construction and operation of a mounting robot used for carrying out an embodiment of method of mounting a torque converter on a transmission according to the present invention.
Figure 2:
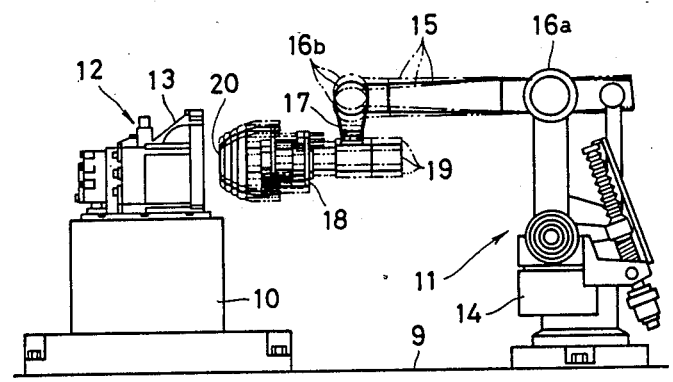

FIGS. 1 and 2 show a torque converter and a transmission to which an embodiment of method according to the present invention is applied, together with an assembling robot used for carrying out the embodiment.

Referring to FIGS. 1 and 2, a supporting base 10 is fixed on a floor 9 and an assembling robot 11 is installed on the floor 9 at a predetermined distance from the supporting base 10. A transmission 12 is placed to be stationary on the supporting base 10 with a case 13 thereof which is provided with an open end facing to the assembling robot 11. The assembling robot 11 comprises a body 14, an arm portion 15 extending from the body 14 toward the supporting base 10, joint portions 16a and 16b, a connecting portion 17, a hand portion 18 and a motor 19 provided to the hand portion 18. The hand portion 18 holds a torque converter 20 and the arm portion 15 is able to move forward and backward in relation to the transmission 12 on the supporting base 10 and also to swing vertically with a supporting point at the joint portion 16a, as shown by dot-dash lines and two-dot-dash lines in FIGS. 1 and 2. The joint portion 16b and the connecting portion 17 contribute to cause the hand portion 18 to maintain a predetermined attitude of the torque converter 20 regardless of the movements of the arm portion 15. The assembling robot 11 is operative to position the torque converter 20 held by the hand portion 18 to face the opening provided on the case 13 of the transmission 12 as shown by solid lines in FIG. 1 or to be inserted into the case 13 of the transmission 12 as shown by dot-dash lines in FIG. 1.

Figure 3:
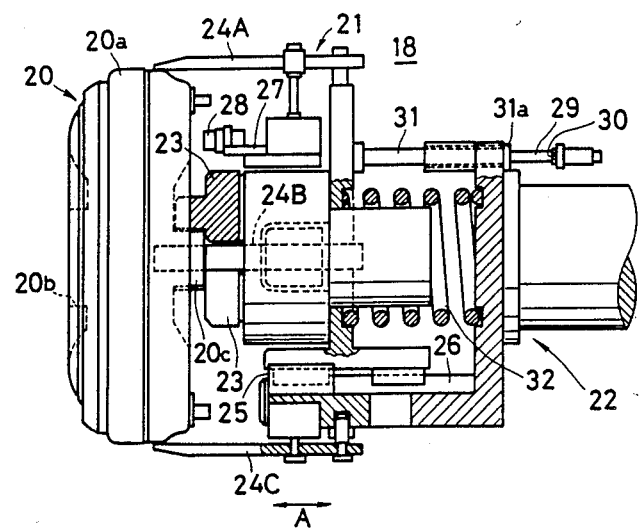
FIGS. 3 and 4 are side views used for explaining the detailed construction and operation of an essential portion of the robot shown in FIGS. 1 and 2.
Figure 4:
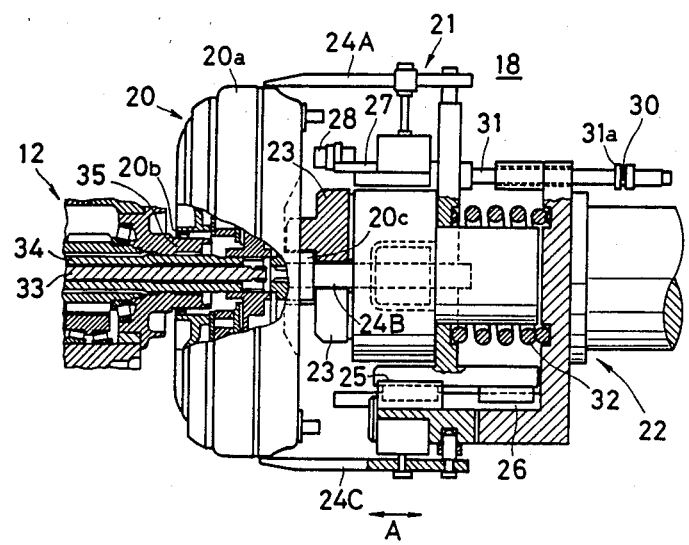

As shown in FIGS. 3 and 4, the torque converter 20 has a case 20a in the shape of a hollow ring which is provided with an opening 20b and a projection 20c opposite with each other at the central part thereof. Further, as shown in FIGS. 3 and 4, the hand portion 18 comprises a movable mechanism 21 coming into contact with the torque converter 20 and a supporting member 22 fixed to the connecting portion 17, which is connected through the joint portion 16b with the arm portion 15, for supporting the movable mechanism 21 to be movable in a direction shown by an arrow A (hereinafter, referred to an A direction).

The movable mechanism 21 of the hand portion 18 has a chucking member 23 which is provided for contacting with the exterior of the projection 20c provided on the case 20a of the torque converter 20 and four contacting method 24A, 24B, 24C and 24D (the contact member 24D is not shown in FIGS. 3 and 4) which are provided for contacting with the exterior of the case 20a of the torque converter 20 at regular angular intervals of 90 degrees. The movable mechanism 21 is further provided with a guide member 25 fixed at the lower portion thereof and a torque converter detector 28 supported by a supporting arm member 27. The guide member 25 is engaged with a guide rail 26 provided to the supporting member 22 for making the movable mechanism 21 move smoothly in the A direction. The torque converter detector 28 is operative to detect the torque converter 20 and produce a detection output when the hand portion 18 of the assembling robot 11 has approached to the torque converter 20 so as to reach a position at a predetermined short distance from the torque converter 20 in process of the holding operation of the arm portion 18 to the torque converter 20. The detection output from the torque converter detector 28 is used for driving the chucking member 23 and the contacting members 24A, 24B, 24C and 24D to come into contact with the case 20a of the torque converter 20.

The supporting member 22 of the hand portion 18 is provided with a limit switch 30 supported by a supporting arm 29 in addition to the guide rail 26. The limit switch 30 is disposed to be pressed by a press portion 31a which is formed at one end of a rod member 31 having the other end thereof fixed to the movable mechanism 21 in a movement of the movable mechanism 21 caused along the guide rail 26 toward the connecting portion 17 in the A direction. When the press portion 31a presses the limit switch 30, the limit switch 30 is turned on and thereby the motor 19 is driven to rotate the arm portion 18, together with the torque converter 20 held by the arm portion 18, by a relatively small angle of rotation.

Further, a coil spring 32 is provided between the movable mechanism 21 and the supporting member 22, whereby the movable mechanism 21 is forced to shift toward the transmission 12.

By the use of the assembling robot 11 constituted above, the torque converter 20 is mounted on the transmission 12 in accordance with one embodiment of method of the present invention as follows.

Figure 5A:
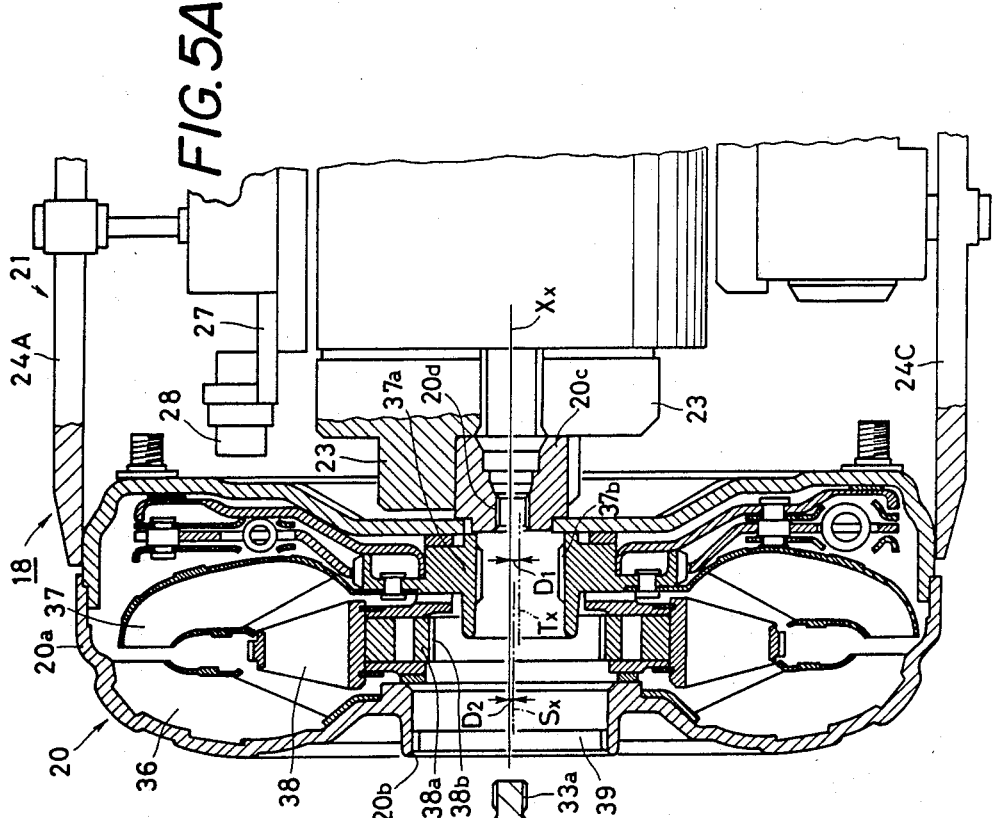
FIG. 5 is a fragmentary cross-sectional view showing a torque converter and a transmission separated from each other to which one embodiment of method according to the present invention is applied.
Figure 5:
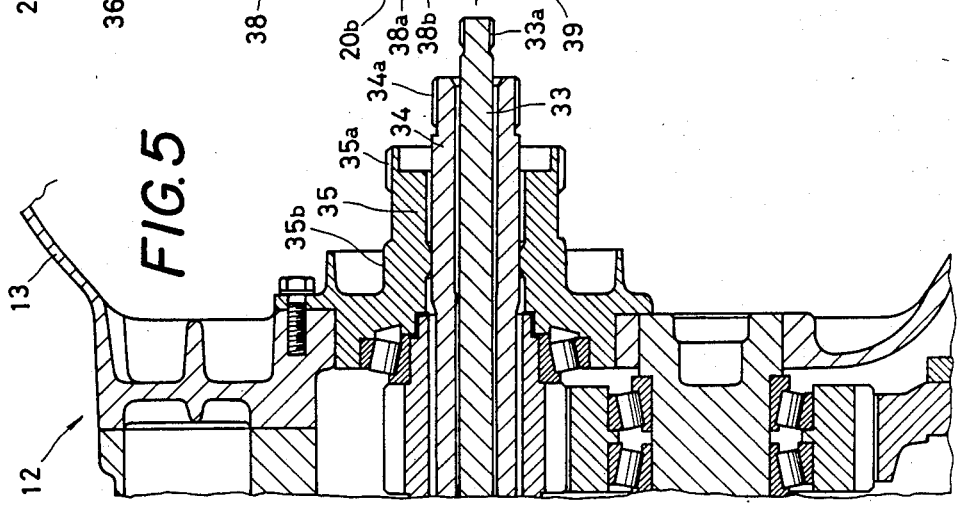

First, the transmission 12 is set on the supporting base 10 to have a main shaft 33 extending horizontally, as shown in FIG. 5, and fastened to be stationary by, for example, appropriate fasteners provided on the supporting base 10 (not shown in drawings). In the transmission 12, as shown in FIG. 5, the main shaft 33 is disposed at the inside of a tubular turbine shaft 34 extending along the main shaft 33 and a tubular member 35 is fixed to the case 13 to be surround the tubular turbine shaft 34. The tubular member 35, tubular turbine shaft 34 and main shaft 33 are arranged coaxially with one another and the tubular member 35 acts as a bearing for the tubular turbine shaft 34. One end portion of the tubular turbine shaft 34 extends from outward from one end portion of the tubular member 35 and one end portion of the main shaft 33 extends further outward from the end portion of the tubular turbine shaft 34, and each of these end portions projects toward the open end of the case 13 of the transmission 12. External spline teeth 33a, 34a and 35a are formed on the end portions of the main shaft 33, tubular turbine shaft 34 and tubular member 35, respectively. Further, a coupling portion 35b is also provided on the tubular member 35 at the inside of the external spline teeth 35a.

Then, as shown in FIGS. 2 and 5A, the torque converter 20 is held by the hand portion 18 of the assembling robot 11 so as to have an imaginary axis Xx thereof extending horizontally and disposed to face the open end of the case 13 of the transmission 12 in which the end portions of the main shaft 33, tubular turbine shaft 34 and tubular member 35 are projected so that the imaginary axis Xx of the torque converter 20 is positioned to be almost coincident with an imaginary axis of the main shaft 33 of the transmission 12. In the torque converter 20, a pump impeller 36 incorporated with the case 20a, a turbine runner 37 provided at its central part with a turbine hub 37a, and a stator 38 provided at its central part with a stator hub 38a are contained in the case 20a, and the turbine runner 37 and the stator 38 are arranged to be displaceable substantially in parallel within respective different ranges of displacement in the case 20a so as to move respectively an imaginary axis Tx of the turbine hub 37a extending in parallel with the imaginary axis Xx and an imaginary axis Sx extending in parallel with the imaginary axis Xx substantially in parallel within respective different ranges of movement.

Accordingly, in the torque converter 20 held by the hand portion 18 of the assembling robot 11 to have its imaginary axis Xx extending horizontally as described above, as shown in FIG. 5, the stator 38 is displaced downward to cause the lowest portion of a peripheral edge thereof to come into contact with the lowest portion of an inner circular edge of the pump impeller 36, so that the imaginary axis Sx of the stator hub 38a is moved into a location lower by a distance $D_2$ than the imaginary axis Xx, and the turbine runner 37 is also displaced downward to cause the highest portion of an inner circular edge thereof to come into contact with the highest portion of the peripheral edge of the stator 38, so that the imaginary axis Tx of the turbine hub 37a is moved into a location lower by a distance $D_1$ which is longer than the distance $D_2$ than the imaginary axis Xx.

The turbine hub 37a has internal spline teeth 37b provided for engaging with the external spline teeth 34a provided on the end portion of the tubular turbine shaft 34 of the transmission 12 and the stator hub 38a has internal spline teeth 38b provided for engaging with the external spline teeth 35a provided on the end portion of the tubular member 35 of the transmission 12. Further, the projection 20c formed on the case 20a of the torque converter 20 has internal spline teeth 20d provided for engaging with the external spline teeth 33a provided on the end portion of the main shaft 33 of the transmission 12.

Under a condition in which the torque converter 20 held by the hand portion 18 of the assembling robot 11 is disposed to face the transmission 12 set on the supporting base 10 in such a manner as described above, the arm portion 15 of the assembling robot 11 is moved to cause the torque converter 20 to shift toward the transmission 12 in the horizontal direction. Simultaneously with this, for example, the arm portion 15 is also moved upward to cause the torque converter 20 to ascend and thereby to move the imaginary axis Xx of the torque converter 20 into a location higher by the distance $D_1$ than the imaginary axis of the main shaft 33 of the transmission 12. With such an upward movement of the imaginary axis Xx of the torque converter 20, the imaginary axis Tx of the turbine hub 37a is moved upward to maintain the distance $D_1$ from the imaginary axis Xx of the torque converter 20 and thereby positioned to be coincide with the imaginary axis of the main shaft 33.

Figure 6:
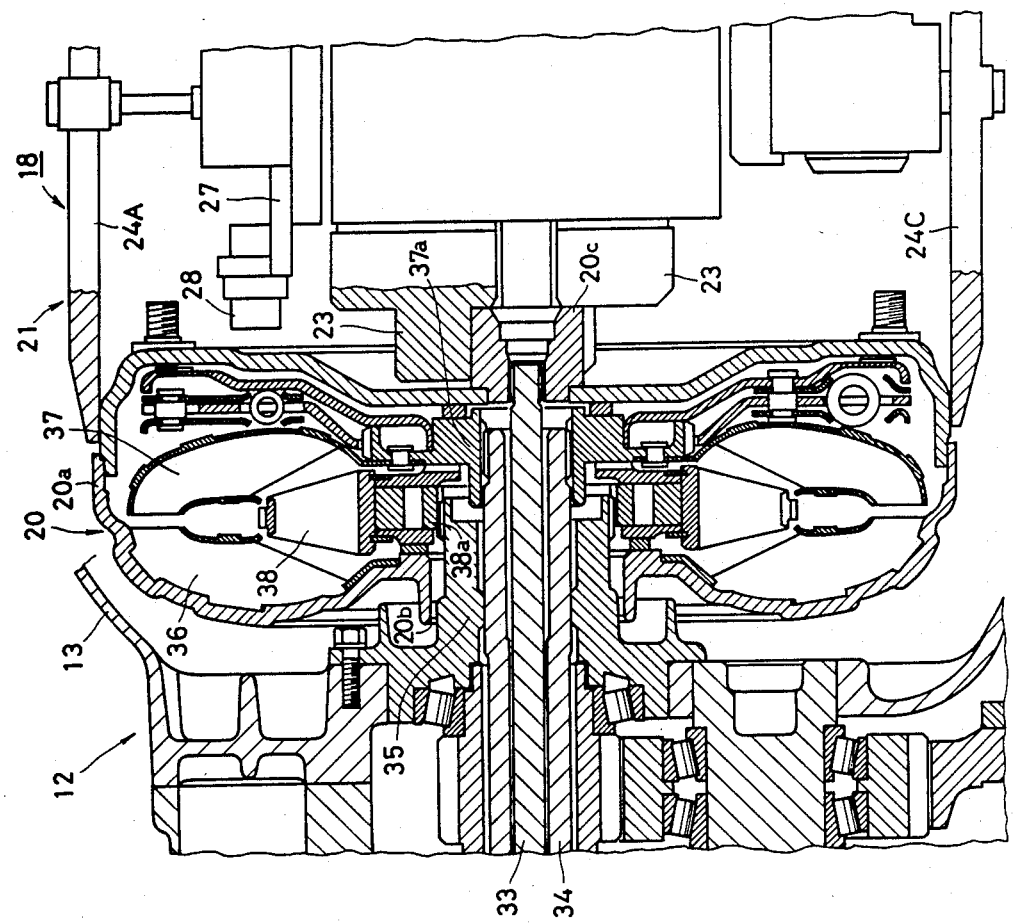
FIG. 6 is a fragmentary cross-sectional view showing the torque converter and the transmission combined through the embodiment of method according to the present invention.

Then, with the shift of the torque converter 20 toward the transmission 12, as shown by dot-dash lines in FIGS. 1 and 6, the end portions of the main shaft 33, the tubular turbine shaft 34 and the tubular member 35 of the transmission 12 having thereon the external spline teeth 33a, the external spline teeth 34a and the external spline teeth 35a, respectively, are inserted through the opening 20b into the case 20a of the torque converter 20, and the internal spline teeth 37b provided on the turbine hub 37a are engaged with the external spline teeth 34a provided on the end portion of the tubular turbine shaft 34.

In the case where the internal spline teeth 37b provided on the turbine hub 37a are not engaged properly with the external spline teeth 34a provided on the end portion of the tubular turbine shaft 34, an end surface of each of the internal spline teeth 37b provided on the turbine hub 37a comes into contact with an end surface of each of the external spline teeth 34a provided on the end portion of the tubular turbine shaft 34, so that the movable mechanism 21 constituting the hand portion 18 of the assembling robot 11, by which the torque converter 20 is held, is shifted toward the connecting potion 17 of the hand portion 18. With such shift of the movable mechanism 21, the limit switch 30 provided on the supporting member 22 constituting the arm portion 15 is pressed by the press portion 31a formed on the rod member 31 to be turned on and the motor 19 is driven to rotate the hand portion 18, together with the torque converter 20 held by the hand portion 18, by a relatively small angle of rotation. As a result of this, the internal spline teeth 37b provided on the turbine hub 37a are caused to engage properly with the external spline teeth 34a provided on the end portion of the tubular turbine shaft 34.

After the turbine hub 37a is engaged with the end portion of the tubular turbine shaft 34 so that the turbine runner 37 is fitted on the tubular turbine shaft 34, as described above, the arm portion 15 of the assembling robot 11 is further moved to cause the torque converter 20 to shift toward the transmission 12 in the horizontal direction by a distance shorter than that in the first horizontal shift of the torque converter 20. Simultaneously with this, the arm portion 15 is also moved downward to cause the torque converter 20 to descend and thereby to move the imaginary axis Xx of the torque converter 20 downward by a distance corresponding to a difference between the distance $D_1$ and the distance $D_2$. With such a downward movement of the imaginary axis Xx of the torque converter 20, the imaginary axis Sx of the stator hub 38a is moved downward to maintain the distance $D_2$ from the imaginary axis Xx of the torque converter 20 and thereby positioned to be coincide with the imaginary axis of the main shaft 33.

Then, with the shift of the torque converter 20 toward the transmission 12, the internal spline teeth 38b provided on the stator hub 38a are engaged with the external spline teeth 35a provided on the end portion of the tubular member 35.

In the case where the internal spline teeth 38b provided on the stator hub 38a are not engaged properly with the external spline teeth 35a provided on the end portion of the tubular member 35, an end surface of each of the internal spline teeth 38b provided on the stator hub 38a comes into contact with an end surface of each of the external spline teeth 35a provided on the end portion of the tubular member 35, so that the movable mechanism 21 of the hand portion 18, by which the torque converter 20 is held, is shifted toward the connecting potion 17 of the hand portion 18. With such shift of the movable mechanism 21 also, the limit switch 30 provided on the supporting member 22 of the arm portion 15 is pressed by the press portion 31a formed on the rod member 31 to be turned on and the motor 19 is driven to rotate the hand portion 18, together with the torque converter 20 held by the hand portion 18, by a relatively small angle of rotation. As a result of this, the internal spline teeth 38b provided on the stator hub 38a are caused to engage properly with the external spline teeth 35a provided on the end portion of the tubular member 35.

After the stator hub 38a is engaged with the end portion of the tubular member 35 so that the stator 38 is fitted on the tubular member 35, the arm portion 15 of the assembling robot 11 is still further moved to cause the torque converter 20 to shift toward the transmission 12 in the horizontal direction by a distance shorter than that in the first horizontal shift of the torque converter 20. Simultaneously with this, the arm portion 15 is further moved downward to cause the torque converter 20 to descend and thereby to move the imaginary axis Xx of the torque converter 20 downward by a short distance corresponding to the distance $D_2$. With such a further downward movement, the imaginary axis Xx of the torque converter 20 is positioned to be coincide with the imaginary axis of the main shaft 33.

Then, with the shift of the torque converter 20 toward the transmission 12, the opening 20b provided on the case 20a of the torque converter 20 is fitted through a bushing member 39 attached thereto on the coupling portion 35b provided on the tubular member 35 and simultaneously the internal spline teeth 20d provided on the projection 20c on the case 20a are engaged with the external spline teeth 33a provided on the end portion of the main shaft 33.

In the case where the internal spline teeth 20d provided on the projection 20c on the case 20a are not engaged properly with the external spline teeth 33a provided on the end portion of the main shaft 33, an end surface of each of the internal spline teeth 20d provided on the projection 20c on the case 20a comes into contact with an end surface of each of the external spline teeth 33a provided on the end portion of the main shaft 33, so that the movable mechanism 21 of the hand portion 18, by which the torque converter 20 is held, is shifted toward the connecting potion 17 of the hand portion 18. With such shift of the movable mechanism 21 also, the limit switch 30 provided on the supporting member 22 of the arm portion 15 is pressed by the press portion 31a formed on the rod member 31 to be turned on and the motor 19 is driven to rotate the hand portion 18, together with the torque converter 20 held by the hand portion 18, by a relatively small angle of rotation. As a result of this, the internal spline teeth 20d provided on the projection 20c on the case 20a are caused to engage properly with the external spline teeth 33a provided on the end portion of the main shaft 33.

Through the above described steps in which the projection 20c on the case 20a of the torque converter 20 is fitted on the end portion of the main shaft 33, the turbine runner 37 is fitted on the end portion of the tubular turbine shaft 34, the stator 38 is fitted on the end portion of the tubular member 35, and the opening 20b provided on the case 20a is fitted on the coupling portion 35b provided on the tubular member 35, respectively, as shown in FIG. 6, the torque converter 20 is mounted on the transmission 12.

What is claimed is:

1. A method of mounting a torque converter on a transmission, wherein said torque converter has a case in which a turbine runner provided at its central part with an engaging portion and a stator provided at its central part with an engaging portion are contained to be displaceable substantially in parallel within respective different ranges of displacement and said transmission has at least two tubular members disposed coaxially in such a manner that an end portion of an inner one of said two tubular members projects outward from an end portion of an outer one of said two tubular members, the method comprising the steps of:

setting the transmission to have said two tubular members extending horizontally;

holding the torque converter by holding means which is movable in vertical and horizontal directions;

positioning the torque converter held by the holding means so as to cause an imaginary axis of one of said turbine runner and said stator to coincide with a common imaginary axis of said two tubular members of the transmission;

moving the torque converter held by the holding means toward the transmission in the horizontal direction so as to engage the engaging portion of one of said turbine runner and said stator, which has the imaginary axis positioned to coincide with the common imaginary axis of said two tubular members of the transmission, with the end portion of the inner one of said two tubular members of the transmission;

positioning further the torque converter held by the holding means so as to cause an imaginary axis of the other of said turbine runner and said stator to coincide with the common imaginary axis of said two tubular members of the transmission; and moving further the torque converter held by the holding means toward the transmission in the horizontal direction so as to engage the engaging portion of the other of said turbine runner and said stator, which has the imaginary axis positioned to coincide with the common imaginary axis of said two tubular members of the transmission, with the end portion of the outer one of said two tubular members of the transmission.

2. A method according to claim 1, wherein each of said step of moving the torque converter in the horizontal direction and said step of moving further the torque converter in the horizontal direction includes, as occasion demands, the step of rotating the torque converter by a relatively small angle of rotation with an axis of rotation coinciding with an imaginary axis of the torque converter.

3. A method according to claim 2, wherein the engaging portions of said turbine runner and said stator are engaged respectively with the end portions of said two tubular members through internal and external spline teeth provided respectively on each of the engaging portions of said turbine runner and said stator and each of the end portions of two tubular members, and said step of rotating the torque converter is carried out when the engaging portions of said two tubular members are not engaged properly with the end portions of said two tubular members, respectively.

4. A method according to claim 1, wherein the range of displacement within which said turbine runner is displaceable is set to be broader than the range of displacement within which the stator is displaceable in the case of the torque converter, said turbine runner is fitted on the end portion of the inner one of said two tubular member through said step of moving the torque converter in the horizontal direction, and said stator is fitted on the end portion of the outer one of said two tubular member through said step of moving further the torque converter in the horizontal direction.

5. A method according to claim 1, wherein a horizontal movement of the torque converter in said step of moving the torque converter in the horizontal direction is larger than an additional horizontal movement of the torque converter in said step of moving further the torque converter in the horizontal direction.

6. A method according to claim 1, wherein the transmission is set to be stationary on a supporting base, and the torque converter is held by a robot to be movable in the vertical and horizontal directions, positioned by the robot so as to cause each of the imaginary axes of said turbine runner and said stator to coincide with the common imaginary axis of said two tubular members of the transmission, and moved by the robot toward the transmission in the horizontal direction so as to engage the engaging portions of said turbine runner and said stator with the end portions of said two tubular members of the transmission, respectively.

7. A method of mounting a torque converter on a transmission, wherein said torque converter has a case which is provided with an engaging portion at its central part and in which a turbine runner provided at its central part with an engaging portion and a stator provided at its central part with an engaging portion are contained to be displaceable substantially in parallel within respective different ranges of displacement and said transmission has two tubular members disposed coaxially in such a manner that an end portion of an inner one of said two tubular members projects outward from an end portion of an outer one of said two tubular members and a shaft member extending at the inside of the inner one of said tubular members with its end portion projecting outward from the end portion of the inner one of said two tubular members, the method comprising the steps of:

setting the transmission to have said two tubular members extending horizontally;

holding the torque converter by holding means which is movable in vertical and horizontal directions;

positioning the torque converter held by the holding means so as to cause an imaginary axis of one of said turbine runner and said stator to coincide with a common imaginary axis of said two tubular members of the transmission;

moving the torque converter held by the holding means toward the transmission in the horizontal direction so as to engage the engaging portion of one of said turbine runner and said stator, which has the imaginary axis positioned to coincide with the common imaginary axis of said two tubular members of the transmission, with the end portion of the inner one of said two tubular members of the transmission;

positioning further the torque converter held by the holding means so as to cause an imaginary axis of the other of said turbine runner and said stator to coincide with the common imaginary axis of said two tubular members of the transmission;

moving further the torque converter held by the holding means toward the transmission in the horizontal direction so as to engage the engaging portion of the other of said turbine runner and said stator, which has the imaginary axis positioned to coincide with the common imaginary axis of said two tubular members of the transmission, with the end portion of the outer one of said two tubular members of the transmission, positioning still further the torque converter held by the holding means so as to cause an imaginary axis of the case to coincide with an imaginary axis of said shaft member of the transmission; and moving still further the torque converter held by the holding means toward the transmission in the horizontal direction so as to engage the engaging portion at the central part of the case, which has the imaginary axis positioned to coincide with the imaginary axis of said shaft member of the transmission, with the end portion of the shaft member of the transmission.

8. A method according to claim 7, wherein each of said step of moving the torque converter in the horizontal direction, said step of moving further the torque converter in the horizontal direction and said step of moving still further the torque converter in the horizontal direction includes, as occasion demands, the step of rotating the torque converter by a relatively small angle of rotation with an axis of rotation coinciding with an imaginary axis of the torque converter.

9. A method according to claim 8, wherein the engaging portions of said turbine runner and said stator and the engaging portion at the central part of the case are engaged respectively with the end portions of said two tubular members and said shaft member through internal and external spline teeth provided respectively on each of the engaging portions of said turbine runner and said stator and the engaging portion at the central part of the case and each of the end portions of two tubular members and said shaft member, and said step of rotating the torque converter is carried out when the engaging portions of said two tubular members and said stator and the engaging portion at the central part of the case are not engaged properly with the end portions of said two tubular members and said shaft member, respectively.

10. A method of mounting a torque converter on a transmission, wherein said torque converter has a case which is provided with internal spline teeth at its central part and in which a turbine runner provided at its central part with internal spline teeth and a stator provided at its central part with internal spline teeth are contained to be displaceable substantially in parallel and a range of displacement within which said turbine runner is displaceable is set to be broader then a range of displacement within which the stator is displaceable, and said transmission has two tubular members disposed coaxially in such a manner that an end portion of an inner one of said two tubular members projects outward from an end portion of an outer one of said two tubular members and a shaft member extending at the inside of the inner one of said tubular members with its end portion projecting outward from the end portion of the inner one of said two tubular members, each of the end portions of said two tubular members and said shaft member being provided thereon external spline teeth, the method comprising the steps of:

setting the transmission to have said two tubular members extending horizontally;

holding the torque converter by holding means which is movable in vertical and horizontal directions;

positioning the torque converter held by the holding means so as to cause an imaginary axis of said turbine runner to coincide with a common imaginary axis of said two tubular members of the transmission;

moving the torque converter held by the holding means toward the transmission in the horizontal direction and, as occasion demands, rotating the torque converter by a relatively small angle of rotation with an axis of rotation coinciding with an imaginary axis of the torque converter so as to engage the internal spline teeth of said turbine runner, which has the imaginary axis positioned to coincide with the common imaginary axis of said two tubular members of the transmission, with the external spline teeth provided on the end portion of the inner one of said two tubular members of the transmission, positioning further the torque converter held by the holding means so as to cause an imaginary axis of said stator to coincide with the common imaginary axis of said two tubular members of the transmission;

moving further the torque converter held by the holding means toward the transmission in the horizontal direction and, as occasion demands, rotating the torque converter by a relatively small angle of rotation with the axis of rotation coinciding with the imaginary axis of the torque converter so as to engage the internal spline teeth of said stator, which has the imaginary axis positioned to coincide with the common imaginary axis of said two tubular members of the transmission, with the external spline teeth provided on the end portion of the outer one of said two tubular members of the transmission, positioning still further the torque converter held by the holding means so as to cause an imaginary axis of said case of the torque converter to coincide with an imaginary axis of said shaft member of the transmission; and moving still further the torque converter held by the holding means toward the transmission in the horizontal direction and, as occasion demands, rotating the torque converter by a relatively small angle of rotation with the axis of rotation coinciding with the imaginary axis of the torque converter so as to engage the internal spline teeth provided at the central part of said case, which has the imaginary axis positioned to coincide with the imaginary axis of said shaft member of the transmission, with the external spline teeth provided on the end portion of said shaft member.

* * * * *